United States Patent
Chen et al.

(10) Patent No.: US 11,650,707 B2
(45) Date of Patent: May 16, 2023

(54) CAPACITIVE SENSING DEVICE AND SENSING METHOD THEREOF

(71) Applicant: SITRONIX TECHNOLOGY CORP., Jhubei (TW)

(72) Inventors: Chun-Liang Chen, Jhubei (TW); Sheng-Ying Lin, Jhubei (TW)

(73) Assignee: Sitronix Technology Corporation, Jhubei (TW)

( * ) Notice: Subject to any disclaimer, the term of this patent is extended or adjusted under 35 U.S.C. 154(b) by 0 days.

(21) Appl. No.: 17/804,021

(22) Filed: May 25, 2022

(65) Prior Publication Data

US 2022/0382415 A1 Dec. 1, 2022

Related U.S. Application Data

(60) Provisional application No. 63/192,718, filed on May 25, 2021.

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05)

(58) Field of Classification Search
CPC .......................... G06F 3/0446; G06F 3/04164
USPC .......................................................... 345/173
See application file for complete search history.

(56) References Cited

U.S. PATENT DOCUMENTS

| | | | |
|---|---|---|---|
| 8,982,091 B1* | 3/2015 | Mohindra | G06F 3/04182 345/173 |
| 2007/0109274 A1* | 5/2007 | Reynolds | G06F 3/041 345/173 |
| 2016/0306456 A1* | 10/2016 | Slamkul | G06F 3/0418 |

* cited by examiner

*Primary Examiner* — Mark Edwards
(74) *Attorney, Agent, or Firm* — Rosenberg, Klein & Lee

(57) ABSTRACT

The present application discloses a capacitive sensing device and a sensing method thereof. A plurality of driving signals corresponding to a plurality of driving codes are outputted to a plurality of driving electrodes, thereby, a plurality of sensing signal are generated on a plurality of sensing electrodes corresponding to the driving electrodes, where the sensing signals are decoded to sensing data by an operation circuit. Hereby, the calculation function of the operation circuit according to the present application may be simplified.

14 Claims, 8 Drawing Sheets

CAPACITIVE SENSING DEVICE AND SENSING METHOD THEREOF

FIELD OF THE INVENTION

The present application relates generally to a sensing circuit and the method thereof, and particularly to a capacitive sensing device and the sensing method thereof.

BACKGROUND OF THE INVENTION

Thanks to the development of consumer electronic devices, consumer electronic devices with touch functions are ubiquitous. In general, the touch panel on a consumer electronic device acts as an input device with an accompanying display panel as a display device for enabling touch input on the display for users. The accompanying display panel of a touch panel can include LCD, FEDs, PDPs, ELDs, and OLEDs. A touch panel allows a user to press or contact using fingers or a stylus. The sensing device on the touch panel senses the user's touch location and, by combining the display messages, produces the corresponding input message.

Accordingly, the present application provides a capacitive sensing device and the sensing method thereof. A driving circuit transmits a plurality of driving signals to a plurality of driving electrodes correspondingly for enabling the plurality of sensing electrodes to generate a plurality of sensing signals and the driving signals are corresponding to the non-orthogonal matrix or the orthogonal matrix. In addition, the of driving codes in the non-orthogonal matrix or the orthogonal matrix are also corresponding to a plurality of sensing data. Thereby, the calculation function of the sensing device can be simplified.

SUMMARY

An objective of the present application is to provide a capacitive sensing device and the sensing method thereof. A driving circuit transmits a plurality of driving signals to the plurality of driving electrodes, and the driving signals are generated according to a plurality of driving codes. The driving codes the driving codes are corresponding to the non-orthogonal matrix or the orthogonal matrix. The plurality of sensing electrodes generate a plurality of sensing signals correspondingly. An operational circuit decodes the plurality of sensing signals according to the non-orthogonal matrix or the orthogonal matrix and generates a plurality of sensing data correspondingly. Thereby, the capacitive sensing device can simply the calculation functions.

To achieve the above objective, the present application provides a capacitive sensing method. A plurality of driving signals are generated according to a plurality of driving codes. A driving circuit transmits the plurality of driving signals to a plurality of driving electrodes. The plurality of driving codes are corresponding to a non-orthogonal matrix or a orthogonal matrix. The corresponding plurality of driving codes of the plurality of driving signals are equivalently input to the non-orthogonal matrix or the orthogonal matrix. The plurality of sensing electrodes generates a plurality of sensing signals to a sensing circuit according to the plurality of driving signals. An operational circuit decodes the plurality of sensing signals according to the non-orthogonal matrix or the orthogonal matrix and generates a plurality of sensing data correspondingly. Thereby, according to the present application, signal saturation is prevented in the capacitive sensing device in signal processing.

To achieve the above objective, the present application provides a capacitive sensing device, which comprises a driving circuit, a panel, a sensing circuit, and an operational circuit. The driving circuit generates a plurality of driving signals according to a plurality of driving codes and transmits the plurality of driving signals to a plurality of driving electrodes. A driving circuit transmits a plurality of driving signals to the plurality of driving electrodes corresponding to the non-orthogonal matrix or the orthogonal matrix. The plurality of sensing electrodes generate a plurality of sensing signals correspondingly. An operational circuit decodes the plurality of sensing signals according to the non-orthogonal matrix or the orthogonal matrix and generates a plurality of sensing data correspondingly. Thereby, by using the calculation functions of the non-orthogonal matrix or the orthogonal matrix, the capacitive sensing device can simply the calculation functions.

DETAILED DESCRIPTION

In order to make the structure and characteristics as well as the effectiveness of the present application to be further understood and recognized, the detailed description of the present application is provided as follows along with embodiments and accompanying figures.

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

To solve the signal saturation problem in signal processing for the sensing device according to the prior art, the present application provides a capacitive sensing device and the method thereof. Driving electrodes and sensing electrodes are disposed to form an orthogonal matrix or a non-orthogonal matrix. For the non-orthogonal matrix, the corresponding driving codes of the driving signal correspond to the elements of the non-orthogonal matrix, including a plurality of first codes and a plurality of second codes. For the orthogonal matrix, the corresponding driving codes of the driving signal correspond to the elements of the orthogonal matrix, including the elements in the first column and the first row being 1 and the rest elements being the elements of the non-orthogonal matrix. Thereby, the signal saturation problem in signal processing according to the present application can be prevented.

In the following description, various embodiments of the present application are described using figures for describing the present application in detail. Nonetheless, the concepts of the present application can be embodied by various forms. Those embodiments are not used to limit the scope and range of the present application.

Figure 1:
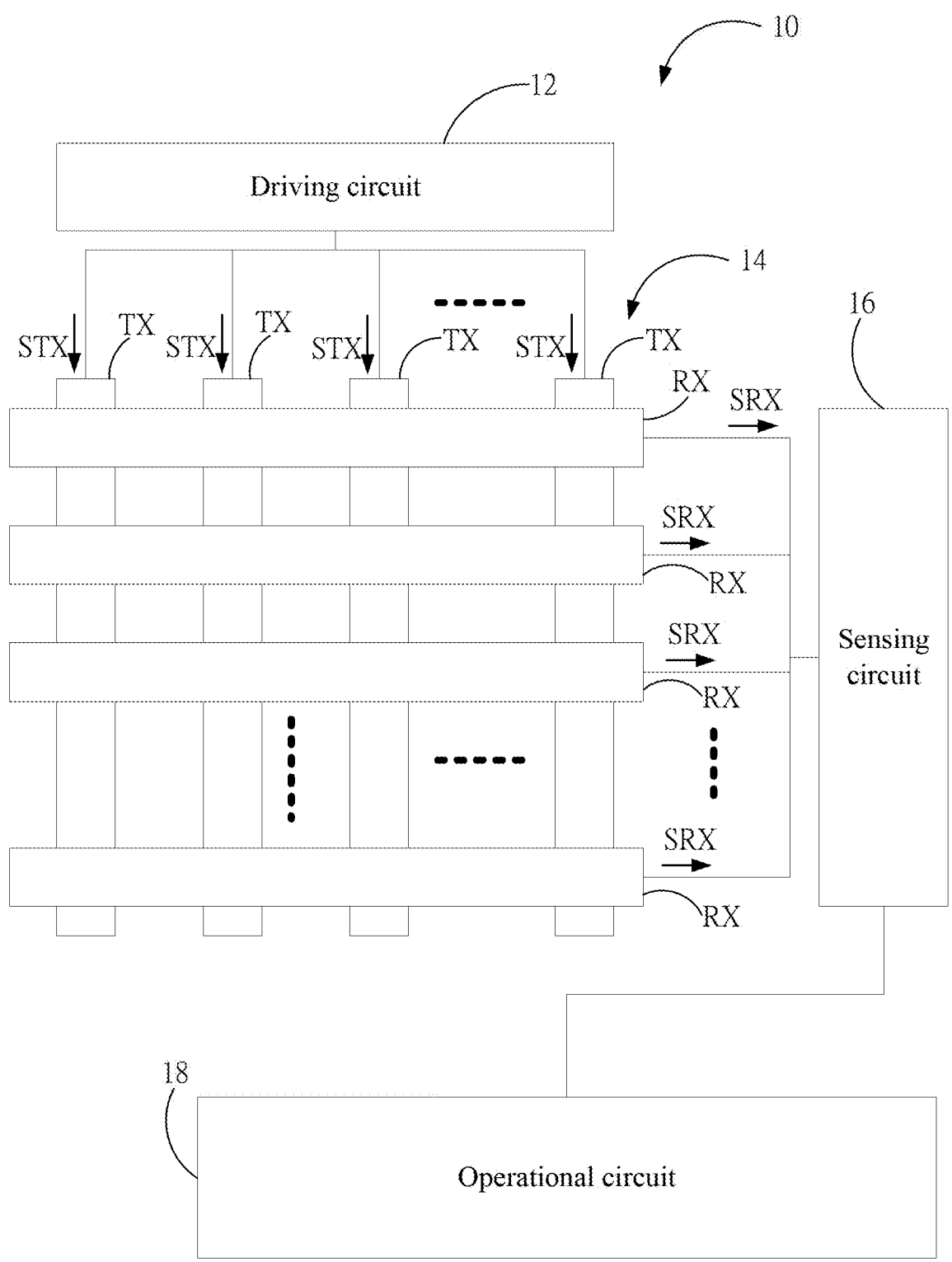
FIG. 1 shows a block diagram of the capacitive sensing device according to an embodiment of the present application.

First, please refer to FIG. 1, which shows a block diagram of the capacitive sensing device according to an embodiment of the present application. As shown in the figure, the capacitive sensing device 10 according to the present embodiment comprises a driving circuit 12, a panel 14, a sensing circuit 16, and an operational circuit 18. The panel 14 includes a plurality of driving electrodes TX and a plurality of sensing electrodes RX. The driving circuit 12 is coupled to the plurality of driving electrodes TX. The plurality of driving electrodes TX and the plurality of sensing electrodes RX are coupled capacitively. The plurality of sensing electrodes RX are coupled to the sensing circuit 16. The sensing circuit 16 is coupled to the operational circuit 18. As shown in FIG. 1, the plurality of driving electrodes TX and the plurality of sensing electrodes RX are interlaced to form a plurality of coupling locations CR.

Figure 2A:
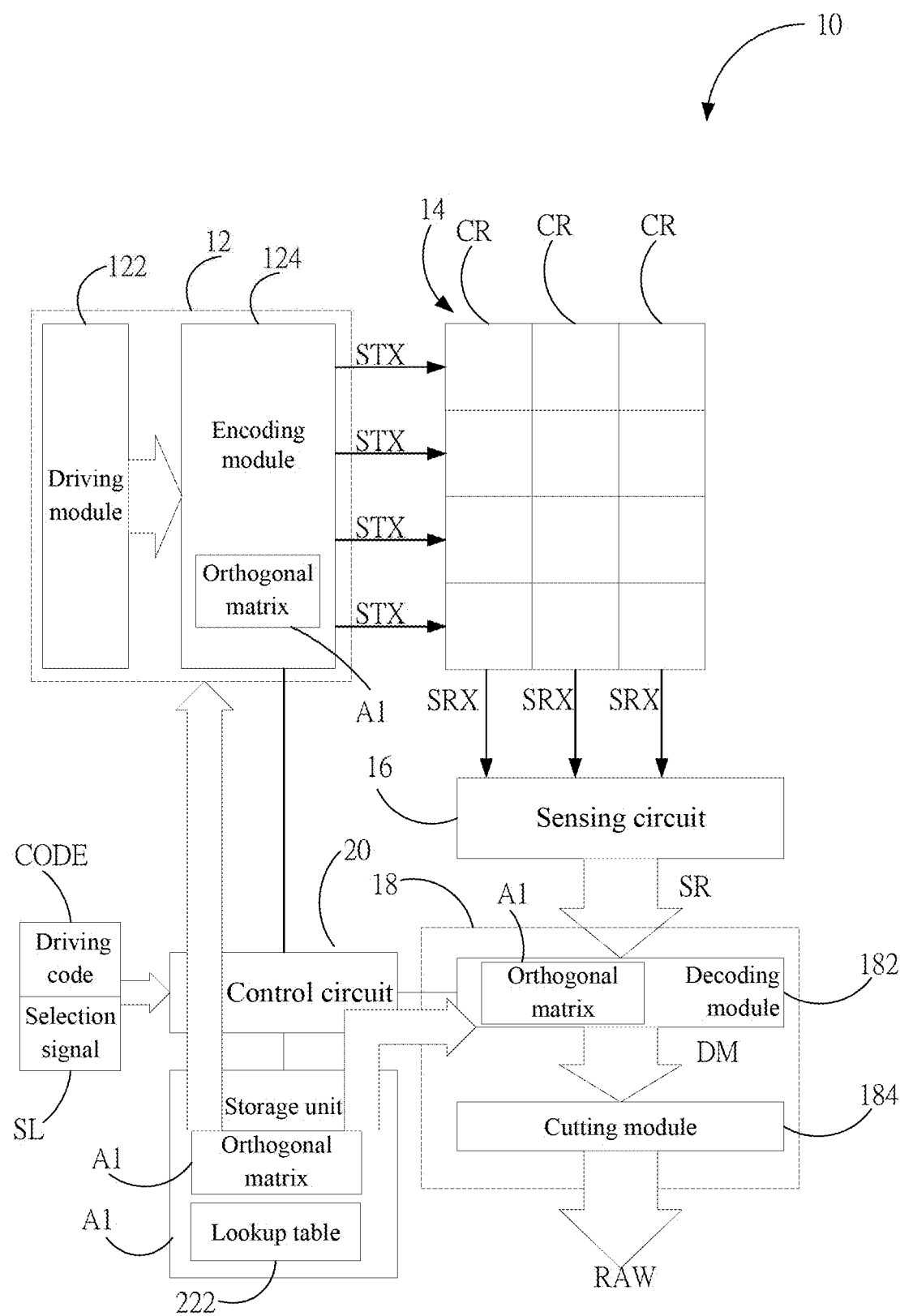
FIG. 2A shows a schematic diagram of signal transmission of the capacitive sensing device corresponding to a 4×4 orthogonal matrix according to an embodiment of the present application.
Figure 2B:
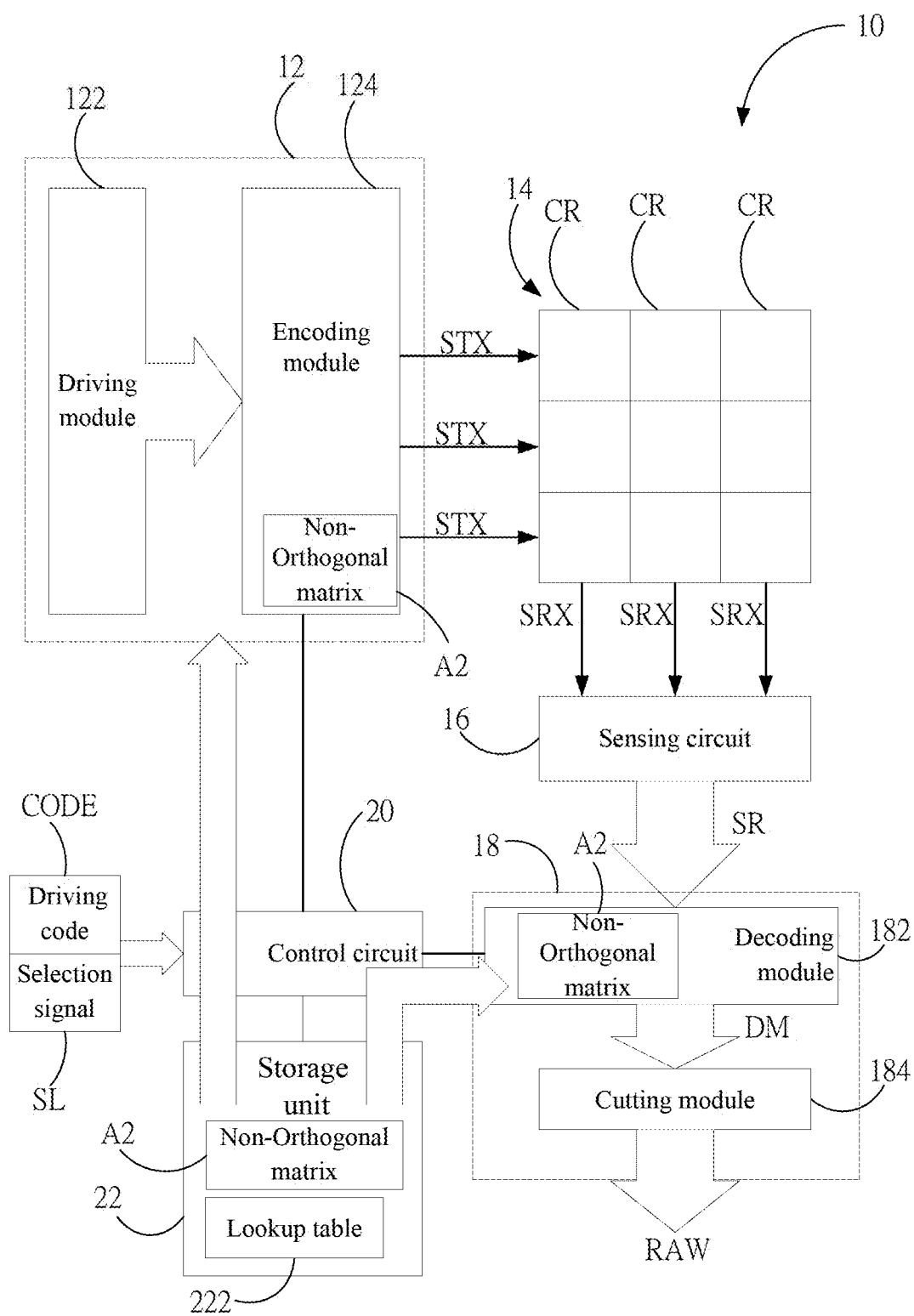
FIG. 2B shows a schematic diagram of signal transmission of the capacitive sensing device corresponding to a 3×3 non-orthogonal matrix according to an embodiment of the present application.

Furthermore, please refer to FIG. 2A and FIG. 2B. The capacitive sensing device 10 according to the present embodiment further comprises a control circuit 20 coupled to an encoding module 124 and a decoding module 182. The control circuit 20 is connected to a storage unit 22 for storing a lookup table. The control circuit 20 controls the encoding module 124 and the decoding module 182 according to the lookup table 222 to correspond to the orthogonal matrix or the non-orthogonal matrix.

Please refer to FIG. 2A and FIG. 2B, which show schematic diagrams of signal transmission of the capacitive sensing device corresponding to a 4×4 orthogonal matrix and a 3×3 non-orthogonal matrix according to an embodiment of the present application. As shown in FIG. 2A, the panel according to the present embodiment uses a 4×4 orthogonal matrix as the conversion matrix. In other words, the control circuit 20 receives a driving code CODE and a selection signal SL. After searching the lookup table 222, an orthogonal matrix A1, which is the 4×4 orthogonal matrix, is given for controlling the driving circuit 12 to generate a plurality of driving signals STX to the plurality of driving electrodes TX according to the orthogonal matrix A1. Then the plurality of driving signals STX are coupled to the plurality of sensing electrodes via the plurality of coupling locations CR. Thereby, the plurality of sensing electrodes RX will generate the corresponding plurality of sensing signals SRX. When the sensing circuit 16 receives the sensing signals SRX of the plurality of sensing electrodes RX, the sensing circuit 16 receives the plurality of sensing signals SRX according to the above 4×4 matrix and transmits a corresponding sensing result SR of the plurality of sensing signals SRX to the operational circuit 18.

Furthermore, the control circuit 20 also controls the decoding module 182 to correspond to the 4×4 matrix. Thereby, according to the present embodiment, a driving module 122 of the driving circuit 12 generates N driving signals STX using an encoding module 124 according to the 4×4 orthogonal matrix. According to the present embodiment, N is 4. The N driving signals STX are input to the panel 14. The sensing circuit 16 receives and transmits the sensing result SR generated by the plurality of sensing signals SRX to the operational circuit 18. A decoding module 182 of the operational circuit 18 decodes according to the inverse matrix of the orthogonal matrix A1. A cutting module 184 of the operational circuit 18 outputs an operational result DM of the decoding module 182 as a plurality of sensing data RAW.

According to an embodiment, if the driving code CODE received by the control circuit 20 is [1 1 1 1], according to the lookup table 222, the index value of the first column index[1] is [1 1 1 1]; the index value of the second column index[2] is [1−1 1−1]; the index value of the third column index[3] is [1 1−1−1]; and the index value of the fourth column index[4] is [1−1−1 1]. The above four index values form the 4×4 orthogonal matrix as shown in equation (1). The 4×4 orthogonal matrix is linearly independent and its inverse matrix exists.

$$Z(4) = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (4)$$

Table 1 is an example. a~l in Table 1 represent the coupling capacitance values at the corresponding coupling locations CR of the panel 14. The signal transmitted by the driving signal STX1 is the first row [1 1 1 1] of the matrix in equation (1); the signal transmitted by the driving signal STX2 is the second row [1−1 1−1] of the matrix in equation (1), and so on. The plurality of sensing signals are SRX1~SRX3. Refer to the right matrix in equation (2) to give the sensing signals SRX1~SRX3. The sensing signal SRX1 is the first row [a+b+c+d a−b+c−d a+b−c−d a−b−c+d] of the right matrix in equation (2); the sensing signal SRX2 is the second row of the right matrix in equation (2), and so on.

TABLE 1

| | | | |
|---|---|---|---|
| STX1 | a | e | i |
| STX2 | b | f | j |
| STX3 | c | g | k |
| STX4 | d | h | l |
| | SRX1 | SRX2 | SRX3 |

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \times \begin{pmatrix} a & e & i \\ b & f & j \\ c & g & k \\ d & h & l \end{pmatrix} = \begin{pmatrix} a+b+c+d & e+f+g+h & i+j+k+l \\ a-b+c-d & e-f+g-h & i-j+k-l \\ a+b-c-d & e+f-g-h & i+j-k-l \\ a-b-c+d & e-f-g+h & i-j-k+l \end{pmatrix} \quad (2)$$

Since the inverse matrix of equation (1) is itself, the decoding module 182 further calculates the following equation (3):

$$\begin{pmatrix} 1 & 1 & 1 & 1 \\ 1 & 1 & -1 & -1 \\ 1 & -1 & -1 & 1 \\ 1 & -1 & 1 & -1 \end{pmatrix} \times \begin{pmatrix} a+b+c+d & e+f+g+h & i+j+k+l \\ a-b+c-d & e-f+g-h & i-j+k-l \\ a+b-c-d & e+f-g-h & i+j-k-l \\ a-b-c+d & e-f-g+h & i-j-k+l \end{pmatrix} = \begin{pmatrix} 4a & 4e & 4i \\ 4b & 4f & 4j \\ 4c & 4g & 4k \\ 4d & 4h & 4l \end{pmatrix} \quad (3)$$

According to equation (3), the operational result DM is given in equation (4) below. According to equation (4), the coupling capacitance values a~l of the panel 14 will be given.

$$\begin{pmatrix} 4a & 4e & 4i \\ 4b & 4f & 4j \\ 4c & 4g & 4k \\ 4d & 4h & 4l \end{pmatrix} \quad (4)$$

Since the matrix is linearly independent, the cutting module 184 cuts the operational result DM shown in equation (4) can give the plurality of sensing data RAW. The sensing data RW can be the coupling capacitance values a~l.

As shown in FIG. 2B, the difference between FIG. 2B and FIG. 2A is that FIG. 2A encodes and decodes the orthogonal matrix A1 while FIG. 2B encodes and decodes the non-orthogonal matrix A2. In FIG. 2B, a 3×3 non-orthogonal matrix is taken as an example. When the control circuit 20 controls the encoding module 124 and the decoding module 182 to correspond to the 3×3 non-orthogonal matrix, the 3×3 non-orthogonal matrix is given by eliminating the first row and the first column of the 4×4 orthogonal matrix as described above. In other words, the (N−1)×(N−1) non-orthogonal matrix is given by eliminating the first row and the first column of the N×N orthogonal matrix. The sensing circuit 18 is used to transmit the corresponding sensing result SR of the N−1 sensing signals SRX to the operational circuit 18. According to the present embodiment, the sensing circuit 16 receives 3 sensing signals SRX. The sensing circuit 18 then transmits the corresponding sensing result SR to the operational circuit 18.

By using a 4×4 Walsh matrix, the non-orthogonal matrix A2 is converted to the 3×3 non-orthogonal matrix, namely, eliminating the first row and the first column of the 4×4 orthogonal matrix in equation (1). The driving circuit 12 generates the N−1 driving signals STX using the driving module 122 and the encoding module 124. The N−1 driving signals STX correspond to the 3×3 non-orthogonal matrix according to the present embodiment and are input to the coupling locations CR of the panel 14. Thereby, the operational circuit 18 receives the sensing result SR, which is equivalent to receive the (N−1)×(N−1) driving code multiplied by the N−1 driving signals STX. In other words, the corresponding sensing result SR of the plurality of sensing signals SRC corresponds to the non-orthogonal matrix A2. The 3×3 non-orthogonal matrix according to the present embodiment is shown in equation (5) below. The non-orthogonal matrix is also linearly independent and its inverse matrix exists.

$$Z(3) = \begin{bmatrix} -1 & 1 & -1 \\ 1 & -1 & -1 \\ -1 & -1 & 1 \end{bmatrix} \quad (3)$$

The non-orthogonal matrix can be given by the orthogonal matrix. Alternatively, it can be given by the lookup table 222. If the control circuit 20 receives the driving code CODE [−1 1 −1], according to the lookup table 222, the index value of the first column index[1] is [−1 1 −1]; the index value of the second column index[2] is [1 −1 −1]; and the index value of the third column index[3] is [−1 −1 1]. Index[2] is the circular left-shift of index[1]; index[3] is the circular left-shift of index[3].

According to another embodiment, the circular right-shift method can be adopted. The index value of the first column index[1] [−1 1 −1] is circular right-shifted to give the index value of the second column index[2] [−1 −1 1], which is further circular right-shifted to give the index value of the third column index[3] [1 −1 −1] and forming a 3×3 non-orthogonal matrix. According to another embodiment, for adjacent index values, for example, the index value of the first column and the index value of the second column, the latter can be formed by the lookup table method, instead of the circular left-shift or right-shift method.

Accordingly, the operational circuit 18 gives the corresponding operational result DM according to the inverse matrix of equation (5) and hence reducing complicated operations such as Walsh transformation. Thereby, according to the present embodiment, the circuit of the operational circuit 18 can be simplified and thus reducing circuit area as compared to the operational circuit according to the prior art.

In addition, according to an embodiment, according to the selection signal SL, the driving circuit 12 and the operational circuit 18 can be set to correspond to the non-orthogonal matrix or the orthogonal matrix. In other words, the selection signal SL is used to select the non-orthogonal matrix or the orthogonal matrix. Thereby, the driving circuit 12 and the operational circuit 18 can adopt the non-orthogonal matrix or the orthogonal matrix.

Figure 3A:
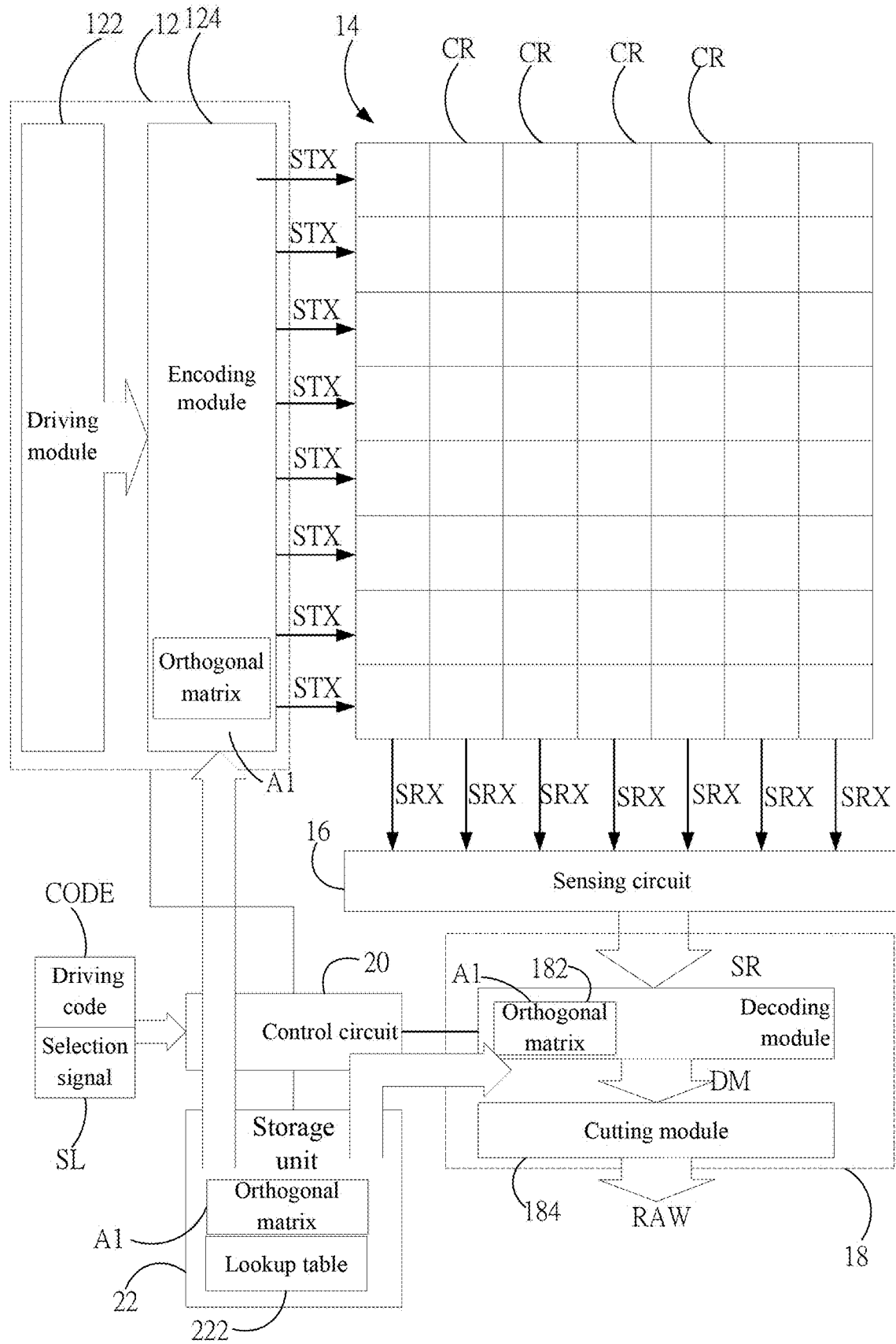
FIG. 3A shows a schematic diagram of signal transmission of the capacitive sensing device corresponding to an 8×8 orthogonal matrix according to another embodiment of the present application.
Figure 3B:
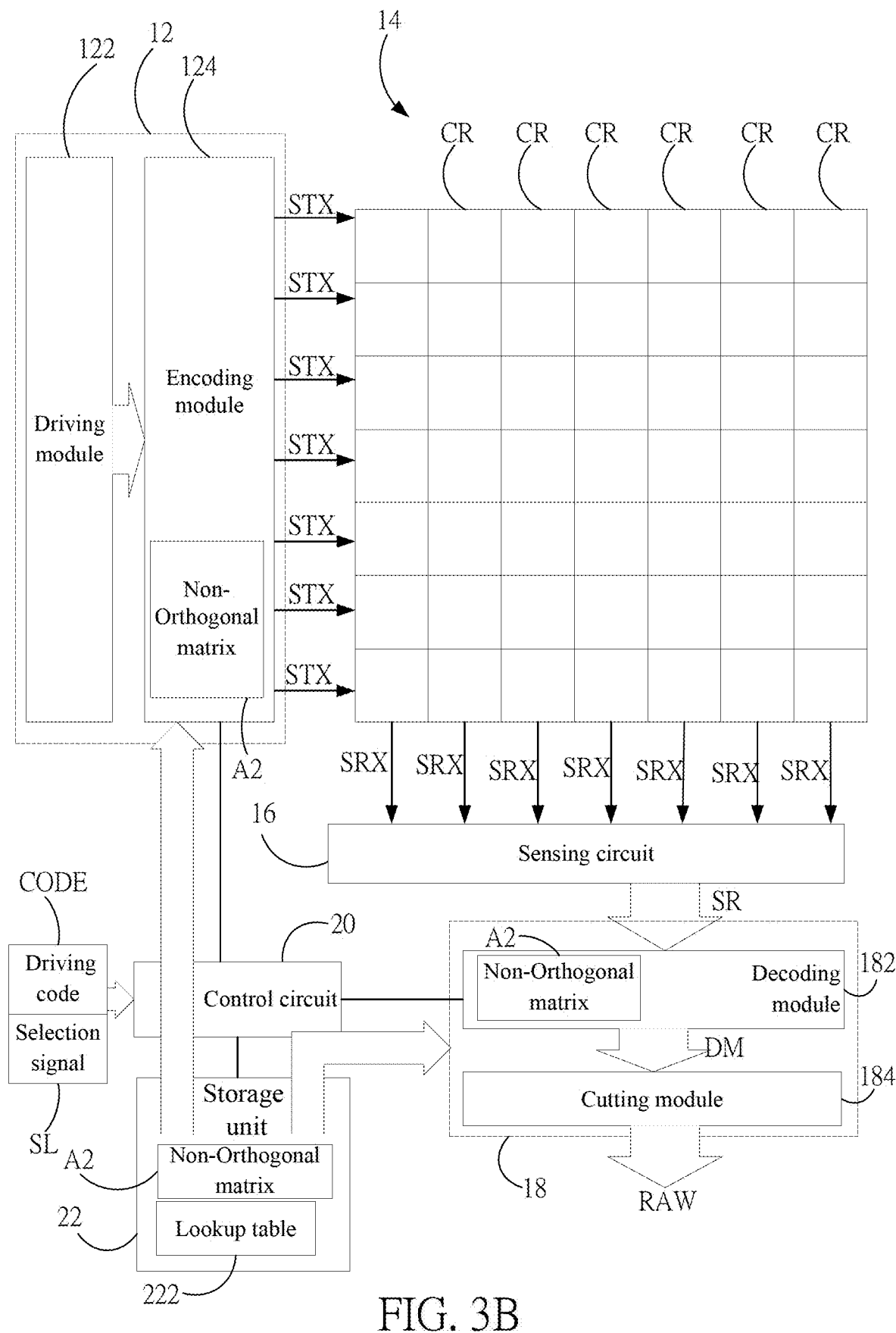
FIG. 3B shows a schematic diagram of signal transmission of the capacitive sensing device corresponding to a 7×7 non-orthogonal matrix according to another embodiment of the present application.

FIG. 3A and FIG. 3B show schematic diagrams of signal transmission of the capacitive sensing device corresponding to an 8×8 orthogonal matrix and to a 7×7 non-orthogonal matrix according to another embodiment of the present application. The control circuit 20 according to the present embodiment controlling the encoding module 124 and the decoding matrix 182 corresponding to the 8×8 matrix are taken as an example. The difference between FIG. 2A and FIG. 3A is that in FIG. 3A, the driving module 122 of the driving circuit 12 and the encoding module 124 generate 8 driving signals SRX according to the orthogonal matrix A2, which is an 8×8 orthogonal matrix according to the present embodiment. The 8 driving signals STX are input to the panel 14. The sensing circuit 16 receives and transmits 7 sensing signals SRX to the operational circuit 18. According to FIG. 3A, the control circuit 20 according to the present embodiment form the 8×8 orthogonal matrix by the lookup table 222 according to the driving code CODE [1 1 1 1 1 1 1 1]. The 8×8 orthogonal matrix is shown in equation (6) below:

$$W(8) = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (8)$$

As shown in FIG. 3B, when the control circuit 20 controls the encoding module 124 and the decoding matrix 182 corresponds to the 7×7 non-orthogonal matrix, the (N−1)×(N−1) matrix is formed by eliminating the first row and the first column of the N×N matrix or searching the lookup table 222, the plurality of driving signals STX are transmitted to the panel 14 according to the 7×7 non-orthogonal matrix. The sensing circuit 16 receives the 7 sensing signals SRX. The control circuit 2—according to the present embodiment eliminates the first column and the first row or searches the lookup table 222 to give the 7×7 non-orthogonal matrix, which is expressed in equation (7) below:

$$W(7) = \begin{bmatrix} -1 & 1 & -1 & 1 & -1 & 1 & -1 \\ 1 & -1 & -1 & 1 & 1 & -1 & -1 \\ -1 & -1 & 1 & 1 & -1 & -1 & 1 \\ 1 & 1 & 1 & -1 & -1 & -1 & -1 \\ -1 & 1 & -1 & -1 & 1 & -1 & 1 \\ 1 & -1 & -1 & -1 & -1 & 1 & 1 \\ -1 & -1 & 1 & -1 & 1 & 1 & -1 \end{bmatrix} \quad (7)$$

According to equation (7), the control circuit 20 acquires the codes in the second row to the seventh row according to the first row and the lookup table 222. The difference between two rows is the difference caused by a shift. For example, the control circuit 20 receives the first row of the driving code CODE [−1 1 −1 1 −1 1 −1] and registers it in the storage unit 22. By searching the lookup table 222, the index value of the first row [−1 1 −1 1 −1 1 −1] is index[1]. According to the index value index[2] of the second row, the code of the second row [1−1 −1 1−1 −1] is given, and so on. Finally, according to the index value index[7] of the seventh row, the code of the seventh row [−1 −1 1 −1 1 1 −1] is given. The searched [1−1 −1 1 1−1 −1] in the second row to [−1 −1 1 −1 1 1−1] in the seventh row are circular left-shift. Besides, the matrix values in the second to seventh row can be searched by the lookup table 222 using the circular right-shift method.

The decoding module 182 of the operational circuit 18 decodes according to the inverse matrix of equation (7) to give the operational result DM. Next, the cutting module 184 cuts each column of the operational result, respectively, to give the plurality of sensing data RAW. The operational circuit 18 decodes the above operational result according to the inverse matrix of equation (7). Accordingly, the operational circuit 18 uses addition or subtraction of matrices to operate the 7×7 non-orthogonal matrix and thereby simplifying complicated operations such as the decomposition operations on matrices larger than 4×4.

In addition to using the corresponding 3×3 non-orthogonal matrix and 7×7 non-orthogonal matrix of equation (2) and (5) according to the above embodiment, the present application can be further applied to a 11×11 non-orthogonal matrix, a 15×15 non-orthogonal matrix, . . . , and an (N−1)×(N−1) non-orthogonal matrix. The above embodiments use odd-order non-orthogonal matrices. Nonetheless, the present application is not limited to odd-order matrices. The present application can be further applied to even-order non-orthogonal matrices as well.

Please refer to the non-orthogonal matrix disclosed in equation (5) above. The non-orthogonal matrix has an odd order and includes a plurality of first codes 1 and a plurality of second codes −1. The sum of all first and second codes on any column of the non-orthogonal matrix is 1 or −1. For example, the sum of all first and second codes on the first column of equation (5) is −1 (the second code); the sums on the second and third columns are also −1 (the second code).

According to another embodiment, the non-orthogonal matrix shown in equation (8) is the inverse matrix of equation (5). The sum of all first and second codes on any column of the non-orthogonal in equation (8) is 1 (the first code). Likewise, the non-orthogonal matrix described in equation (7) above has an odd order and includes first code 1 and second codes −1. The sum of all first and second codes on any column of the non-orthogonal in equation (7) is 1 (the first code) or −1 (the second code). Thereby, when a non-orthogonal matrix has an odd order, the sum of all first and second codes on any column of the non-orthogonal is the first code or the second code. Furthermore, when a non-orthogonal matrix has an even order, the sum of all first and second codes on any column of the non-orthogonal is twice the first code or twice the second code. According to another embodiment, the code in a matrix can correspond to a level. For example, the first code corresponds to a first level such as 4.7V; the second code corresponds to a second level such as −4.7V. According to this embodiment, the first level 4.7V and the second level −4.7V form the non-orthogonal matrix. In other words, when a plurality of first levels and a plurality of second levels of the plurality of driving codes form a non-orthogonal matrix and when the non-orthogonal matrix has an odd order, the sum of all first and second levels on any column of the non-orthogonal is 4.7 (the first level) or −4.7 (the second level); when the non-orthogonal matrix has an even order, the sum of all first and second levels on any column of the non-orthogonal is 9.4 (twice the first level) or −9.4 (twice the second level). Namely, when a plurality of first levels and a plurality of second levels form a non-orthogonal matrix and when the non-orthogonal matrix has an odd order, the sum of all first and second levels on any column of the non-orthogonal is the first level or the second level; when the non-orthogonal matrix has an even order, the sum of all first and second levels on any column of the non-orthogonal is twice the first level or twice the second level.

$$Z(3) = \begin{bmatrix} 1 & -1 & 1 \\ -1 & 1 & 1 \\ 1 & 1 & -1 \end{bmatrix} \quad (8)$$

According to the summation result as described above, the present application can avoid multiple-times increase of the corresponding levels in the matrix elements of the operational result DM and thus increasing the signal-to-noise ratio of the panel 14, as well as preventing signal saturation and electromagnetic interference. In particular, according to the above embodiments, when the driving circuit 12 transmits the plurality of driving signals STX to the plurality of driving electrodes TX according to the orthogonal matrix A1 or the non-orthogonal matrix A2, the signals in each wire coupled to the plurality driving electrodes TX by the driving circuit 12 include multiple positive and negative signals. Thereby, the electromagnetic interference will be reduced and the influence on adjacent driving electrodes TX will be lowered. Consequently, the influence on the corresponding sensing signals SRX can be reduced and hence maintaining the sensing performance of the capacitive sensing device 10.

Assume $H_n$ represents a Hadamard matrix with elements $h_{l,k}$ and $h_{k,l}$ being 1, where k=1, 2, . . . n. $A_{n-1}$ is a non-orthogonal matrix.

$$\left(\frac{1}{n}\right)A_{n-1}A_{n-1}^T$$

is the inverse matrix of equation (9) below. n is a natural number.

Let

The operational result of equation (11) is shown in equation (13) below:

$$\begin{pmatrix} (n-1) & -1 & \ldots & -1 \\ -1 & (n-1) & & \vdots \\ \vdots & & \ddots & -1 \\ -1 & \ldots & -1 & (n-1) \end{pmatrix} \quad (13)$$

According to equation (13), the following equation (14) will be given:

$$A_{n-1}^T \cdot A_{n-1} = \begin{pmatrix} (n-1) & -1 & \cdots & -1 & -1 \\ -1 & (n-1) & \cdots & -1 & -1 \\ \vdots & \vdots & \ddots & \vdots & \vdots \\ -1 & -1 & \cdots & (n-1) & -1 \\ -1 & -1 & \cdots & -1 & (n-1) \end{pmatrix} \overbrace{\phantom{XXXXXXXXXXXXXXXXXX}}^{(n-1)\times(n-1) \text{ matrix}} \quad (14)$$

The following equation (15) will be deduced:

$$A_{n-1}^T \cdot A_{n-1} = \begin{pmatrix} 2 & 1 & \cdots & 1 \\ 1 & 2 & & \vdots \\ \vdots & & \ddots & 1 \\ 1 & \cdots & 1 & 2 \end{pmatrix} \begin{pmatrix} 2 & 1 & \cdots & 1 \\ 1 & 2 & & \vdots \\ \vdots & & \ddots & 1 \\ 1 & \cdots & 1 & 2 \end{pmatrix} = \begin{pmatrix} (n-1) & -1 & \cdots & -1 \\ -1 & (n-1) & & -1 \\ \vdots & & \ddots & -1 \\ -1 & -1 & \cdots & (n-1) \end{pmatrix} = nI_{x-1} \quad (15)$$

According to equations (14) and (15), $A_{n-1}$ and $A_{n-1}^T$ exhibit the operational result of linear equations; the codes are linearly independent.

Assume an n-order non-orthogonal matrix is expressed in equation (16) below:

$$A_n^T \cdot A_n = (n+1)\begin{pmatrix} 2 & 1 & \cdots & 1 \\ 1 & 2 & & \vdots \\ \vdots & & \ddots & 1 \\ 1 & \cdots & 1 & 2 \end{pmatrix}^{-1} \quad (17)$$

Canceling $C_{Panel}$ on both sides of equation (16) gives equation (17). $A_n A_n^T$ is the inverse matrix multiplied by n+1. Then the inverse matrix of $$\begin{pmatrix} 2 & 1 & \cdots & 1 \\ 1 & 2 & & \vdots \\ \vdots & & \ddots & 1 \\ 1 & \cdots & 1 & 2 \end{pmatrix} \text{ is } \left(\frac{1}{n+1}\right) A_n^T A_n.$$

In addition, $A_n A_n^T$ represents linear equations. According to equation (18), it is known that the inverse matrix of $A_n A_n^T$ exists.

Figure 4:
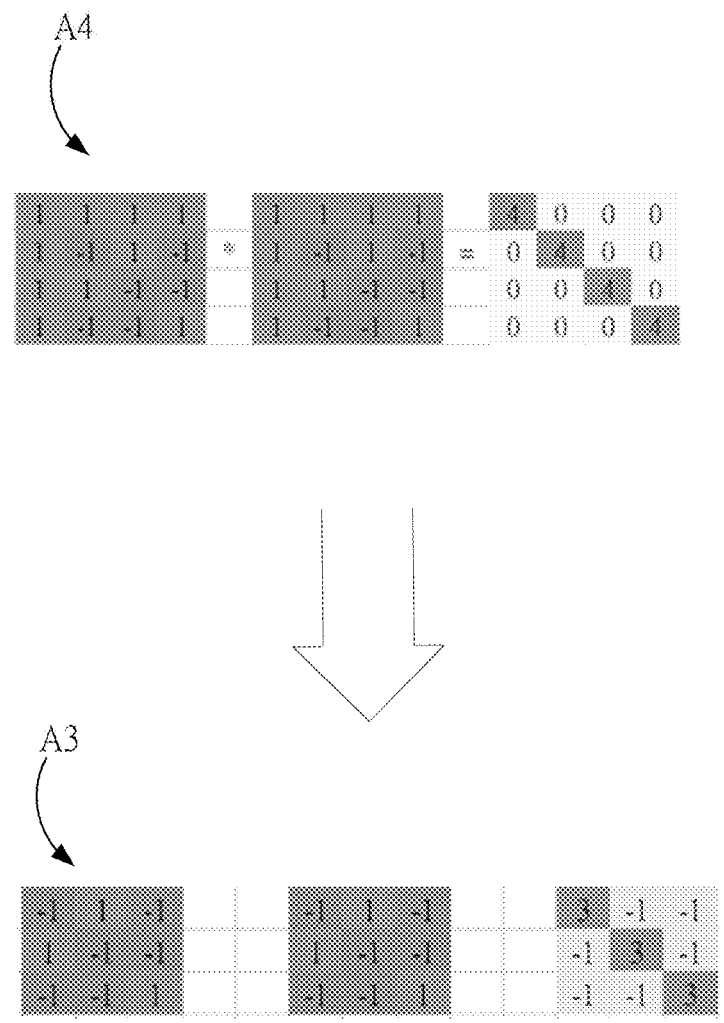
FIG. 4 shows a schematic diagram of converting a 4×4 matrix to a 3×3 matrix.
Figure 5:
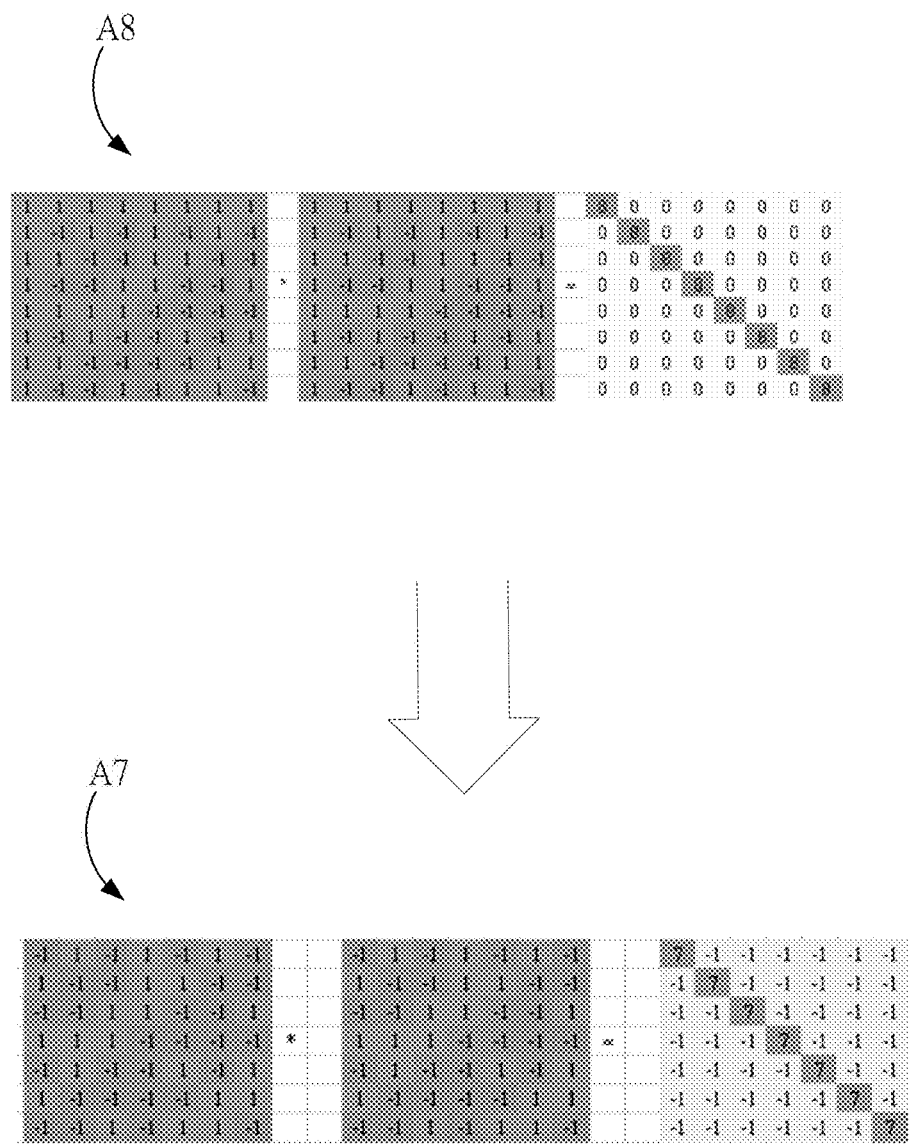
FIG. 5 shows a schematic diagram of converting an 8×8 matrix to a 7×7 matrix.
Figure 6:
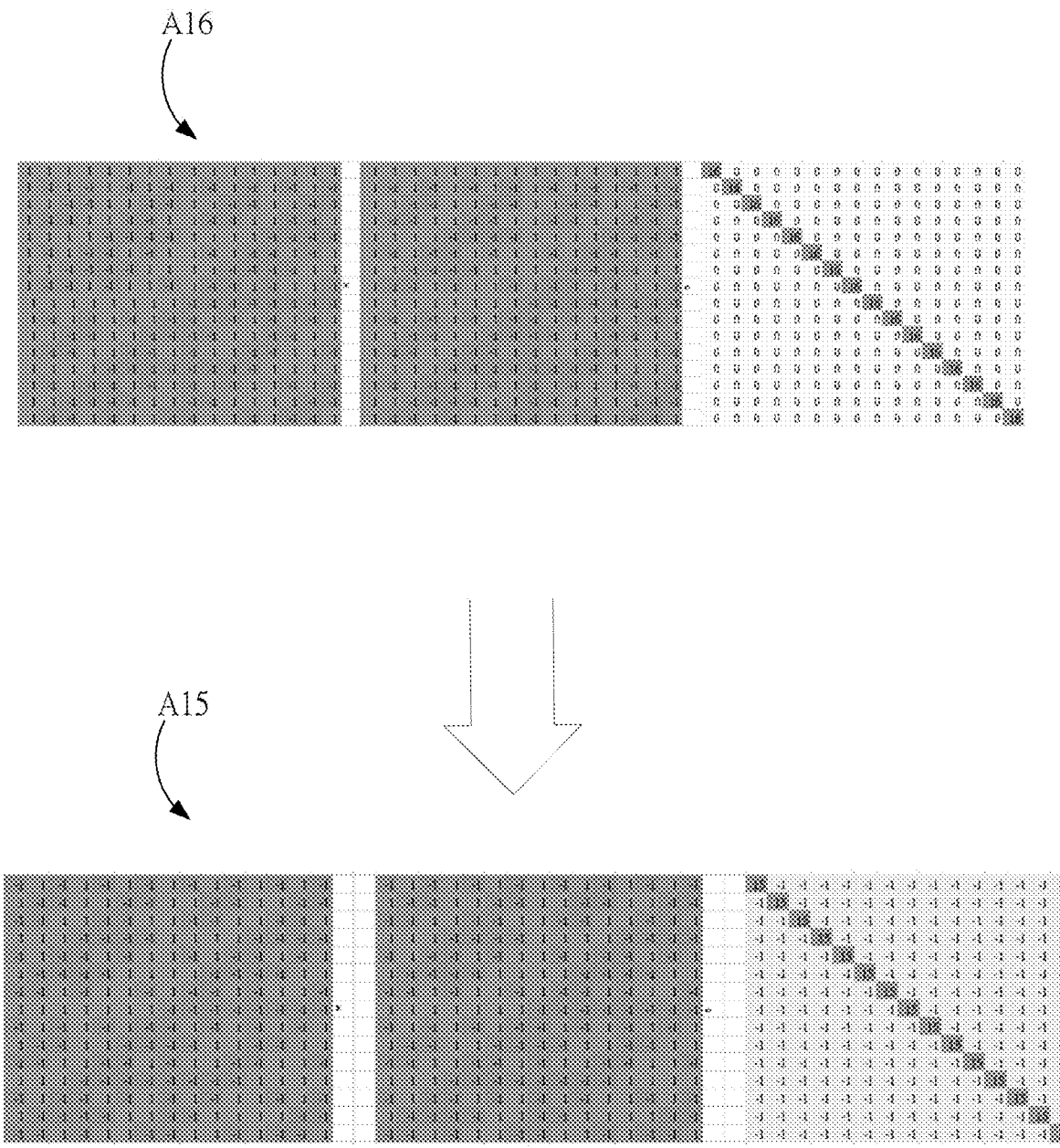
FIG. 6 shows a schematic diagram of converting a 16×16 matrix to a 15×15 matrix.

As shown in FIG. 4, the above 4×4 orthogonal matrix A4 is converted to a 3×3 non-orthogonal matrix A3. As shown in FIG. 5, the above 8×8 orthogonal matrix A8 is converted to a 7×7 non-orthogonal matrix A7. As shown in FIG. 6, the above 16×16 orthogonal matrix A16 is converted to a 15×15 non-orthogonal matrix A15.

As shown in the above embodiments, the capacitive sensing device and the sensing method thereof according to the present application use the driving circuit to provide the corresponding driving signals to the driving electrodes of the panel according to the driving codes of the non-orthogonal matrix or the orthogonal matrix. The sensing circuit receives the sensing signals generated by the sensing electrodes on the panel. The operational circuit receives and decodes the sensing signals according to the inverse matrix of the non-orthogonal matrix or the orthogonal matrix as described above to give the corresponding sensing data. The operations of the operational circuit for the non-orthogonal matrix or the orthogonal matrix are addition or subtraction of matrices only, simplifying the operational functions of the operational circuit. Thereby, the circuit area of the operational circuit can be reduced and the signal-to-noise ratio of the driving signals can be improved as well.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A sensing method of a capacitive sensing device, comprising steps of:
generating a plurality of driving signals according to a non-orthogonal matrix or an orthogonal matrix corresponding to a plurality of driving codes;
setting codes of said orthogonal matrix according to said plurality of driving codes;
setting said plurality of driving signals as said non-orthogonal matrix or said orthogonal matrix according to a selection signal;
forming and outputting said non-orthogonal matrix or said orthogonal matrix according to a plurality of index values and said plurality of driving codes;
a driving circuit transmitting said plurality of driving signals to a plurality of driving electrodes;
a plurality of sensing electrodes generating a plurality of corresponding sensing signals according to said plurality of driving signals of said plurality of driving electrodes;
a sensing circuit receiving and transmitting said plurality of sensing signals to an operational circuit; and
said operational circuit decoding said plurality of sensing signals and generating a plurality of corresponding sensing data;
where when said plurality of driving signals are set to correspond to said non-orthogonal matrix according to said selection signal, eliminating the first column and the first row of said orthogonal matrix or acquiring said non-orthogonal matrix by searching a lookup table, and said driving circuit outputs said plurality of driving signals to said plurality of driving electrodes according to said non-orthogonal matrix; and
when said plurality of driving signals are set to correspond to said orthogonal matrix, said driving circuit outputs said plurality of driving signals to said plurality of driving electrodes directly according to said orthogonal matrix.

2. The sensing method of a capacitive sensing device of claim 1, wherein a plurality of rows correspond to said plurality of index values of said lookup table.

3. The sensing method of a capacitive sensing device of claim 1, wherein said operational circuit decodes said plurality of sensing signals to give an operational result according to an inverse matrix of said non-orthogonal matrix or said orthogonal and cuts said operation result to give said plurality of sensing data.

4. The sensing method of a capacitive sensing device of claim 1, wherein when a plurality of first codes and a plurality of second codes of said plurality of driving codes form an odd-order matrix, the sum of said plurality of first codes and said plurality of second codes on any column of said non-orthogonal matrix is said first code or said second code.

5. The sensing method of a capacitive sensing device of claim 1, wherein when a plurality of first codes and a plurality of second codes of said plurality of driving codes form an even-order matrix, the sum of said plurality of first codes and said plurality of second codes on any column of said non-orthogonal matrix is twice said first code or twice said second code.

6. The sensing method of a capacitive sensing device of claim 1, wherein when a plurality of first levels and a plurality of second levels of said plurality of driving codes form an odd-order matrix, the sum of said plurality of first levels and said plurality of second levels on any column of said non-orthogonal matrix is said first level or said second level.

7. The sensing method of a capacitive sensing device of claim 1, wherein when a plurality of first levels and a plurality of second levels of said plurality of driving codes form an even-order matrix, the sum of said plurality of first levels and said plurality of second levels on any column of said non-orthogonal matrix is twice said first level or twice said second level.

8. A capacitive sensing device, comprising:
- a driving circuit, generating a plurality of driving signals according to a plurality of driving codes, and said plurality of driving codes corresponding to a non-orthogonal matrix or an orthogonal matrix;
- a plurality of driving electrodes, receiving said plurality of driving signals;
- a plurality of sensing electrodes, coupled with said plurality of driving electrodes, and generating a plurality of sensing signals according to said plurality of driving signals; and
- an operational circuit, decoding said plurality of sensing signals according to said non-orthogonal matrix or said orthogonal, and generating a plurality of sensing data;
- a control circuit, setting said plurality of driving codes according to said orthogonal matrix and setting said driving circuit and said operational circuit to correspond to said non-orthogonal matrix or said orthogonal matrix according to a selection signal, forming said non-orthogonal matrix or said orthogonal matrix according to a plurality of index values and said plurality of driving codes and controlling said driving circuit to output said corresponding driving signals, eliminating the first column and the first row of said orthogonal matrix and said driving circuit outputting said plurality of driving signals to said plurality of driving electrodes according to said non-orthogonal matrix when set to said non-orthogonal matrix, and said driving circuit outputting said plurality of driving signals to said plurality of driving electrodes directly according to said orthogonal matrix when set to said orthogonal matrix.

9. The capacitive sensing device of claim 8, wherein when a plurality of first codes and a plurality of second codes of said plurality of driving codes form an odd-order matrix, the sum of said plurality of first codes and said plurality of second codes on any column of said non-orthogonal matrix is said first code or said second code.

10. The capacitive sensing device of claim 8, wherein when a plurality of first codes and a plurality of second codes of said plurality of driving codes form an even-order matrix, the sum of said plurality of first codes and said plurality of second codes on any column of said non-orthogonal matrix is twice said first code or twice said second code.

11. The capacitive sensing device of claim 8, wherein when a plurality of first levels and a plurality of second levels of said plurality of driving codes form an odd-order matrix, the sum of said plurality of first levels and said plurality of second levels on any column of said non-orthogonal matrix is said first level or said second level.

12. The capacitive sensing device of claim 8, wherein when a plurality of first levels and a plurality of second levels of said plurality of driving codes form an even-order matrix, the sum of said plurality of first levels and said plurality of second levels on any column of said non-orthogonal matrix is twice said first level or twice said second level.

13. The capacitive sensing device of claim 8, wherein said driving circuit further includes an encoding module; and said encoding module encodes said plurality of driving signals to correspond to said non-orthogonal matrix or said orthogonal matrix according to said plurality of driving codes, and transmits said plurality of encoded driving signals to said plurality of driving electrodes.

14. The capacitive sensing device of claim 8, wherein said operation circuit further includes a decoding module and a cutting module; said decoding module decodes said plurality of sensing signals to an operational result according to an inverse matrix of said non-orthogonal matrix or said orthogonal matrix; and said cutting module cuts said operational result to said plurality of sensing data.

* * * * *